United States Patent
Risch et al.

(10) Patent No.: US 11,305,467 B2
(45) Date of Patent: Apr. 19, 2022

(54) TOGGLED ROLL STACK

(71) Applicant: MEGA MACHINERY, INC., Riverside, CA (US)

(72) Inventors: Richard Risch, Riverside, CA (US); Roger A. Blaney, Exeter, CA (US)

(73) Assignee: Mega Machinery, Inc., Riverside, CA (US)

(*) Notice: Subject to any disclaimer, the term of this patent is extended or adjusted under 35 U.S.C. 154(b) by 134 days.

(21) Appl. No.: 16/602,983

(22) Filed: Jan. 8, 2020

(65) Prior Publication Data
US 2021/0206034 A1 Jul. 8, 2021

(51) Int. Cl.
*B29C 43/24* (2006.01)
*B29C 48/08* (2019.01)
*B29C 45/82* (2006.01)
*B29C 33/24* (2006.01)
*B29C 59/04* (2006.01)

(52) U.S. Cl.
CPC .............. *B29C 43/24* (2013.01); *B29C 33/24* (2013.01); *B29C 45/82* (2013.01); *B29C 48/08* (2019.02); *B29C 59/04* (2013.01)

(58) Field of Classification Search
CPC ....... B29C 43/24; B29C 43/245; B29C 43/32; B29C 33/24; B29C 33/26; B29C 48/35
See application file for complete search history.

(56) References Cited

U.S. PATENT DOCUMENTS

| | | | |
|---|---|---|---|
| 420,631 A | 2/1890 | Steinthal | |
| 2,382,177 A | 8/1945 | Schanz | |
| 3,346,913 A * | 10/1967 | Lake | B29C 43/24 425/194 |
| 3,359,597 A | 12/1967 | Bainton | |
| 3,600,361 A | 8/1971 | Heacock | |
| 3,729,364 A | 4/1973 | Doleman | |
| 3,947,201 A | 3/1976 | Ellwood | |
| 4,354,814 A | 10/1982 | Grimminger | |
| 4,372,736 A | 2/1983 | Gooch | |
| 4,525,318 A | 6/1985 | Reil | |
| 4,632,655 A * | 12/1986 | Benkwitz | B21B 31/103 100/162 R |
| 4,810,179 A | 3/1989 | Cavanagh | |
| 4,986,177 A * | 1/1991 | Masek | B29C 43/24 100/163 R |
| 5,542,836 A * | 8/1996 | Gross | B29C 48/08 425/141 |
| 5,738,007 A * | 4/1998 | Roerig | D21G 1/00 100/327 |
| 6,257,862 B1 | 7/2001 | Nissel | |

(Continued)

FOREIGN PATENT DOCUMENTS

| | | |
|---|---|---|
| GB | 664787 A | 1/1952 |
| GB | 1139400 A | 5/1967 |

(Continued)

*Primary Examiner* — Kelly M Gambetta
*Assistant Examiner* — Virak Nguon
(74) *Attorney, Agent, or Firm* — Tom Streeter

(57) ABSTRACT

A roll stack for the production of plastic sheeting uses a pneumatically-operated toggle joint, instead of a hydraulic press, to precisely separate two rollers. The pneumatically-operated toggle joint allows the rollers to be more quickly and safely further separated from each other in case there is an emergency.

8 Claims, 4 Drawing Sheets

(56) References Cited

U.S. PATENT DOCUMENTS

| | | | | |
|---|---|---|---|---|
| 6,325,265 | B1 * | 12/2001 | Munch | D21G 9/0063 |
| | | | | 226/101 |
| 6,475,420 | B1 * | 11/2002 | Numrich | B29C 43/222 |
| | | | | 264/211.12 |
| 6,495,214 | B1 * | 12/2002 | Prix | B29C 43/28 |
| | | | | 427/510 |
| 6,682,333 | B2 | 1/2004 | Ulcej | |
| 6,914,406 | B1 | 7/2005 | Wilkes | |
| 7,354,187 | B2 | 4/2008 | Yada | |
| 8,043,691 | B2 | 10/2011 | Numrich | |
| 8,517,714 | B2 | 8/2013 | Matsumoto | |
| 9,738,045 | B2 | 8/2017 | Burg | |
| 2008/0182091 | A1 | 7/2008 | Guenanten | |
| 2014/0070449 | A1 | 3/2014 | Van De Hee | |
| 2014/0175694 | A1 | 6/2014 | Mizura | |
| 2015/0352613 | A1 * | 12/2015 | Le Gal | B29C 43/305 |
| | | | | 429/316 |
| 2018/0126622 | A1 | 5/2018 | Herbing | |

FOREIGN PATENT DOCUMENTS

| | | | |
|---|---|---|---|
| GB | 1474621 | A | 5/1977 |
| GB | 1504277 | A | 3/1978 |

\* cited by examiner

TOGGLED ROLL STACK

BACKGROUND OF THE INVENTION

This invention relates to the manufacture of plastic sheeting, and has particular relation to doing so with safety.

Plastic sheeting is manufactured by extruding molten plastic through a slot die. The slot die is held above a pair of parallel horizontal rollers, with the slot oriented parallel to the axial shafts of the rollers. The extruded plastic is compressed and rolled between the two rollers. These rollers are actively cooled, and remove enough heat from the molten plastic that it is no longer molten after it has passed between them.

Usually, although not necessarily, the resulting plastic sheet is then rolled over a third roller. The third roller can provide additional cooling, tensioning, texturing of the sheet's surface, or other finishing.

The combination of the three (or two) rollers is called a "roll stack". The sheet, upon emerging from the roll stack, is rolled onto a storage roll on a winder. When the storage roll is full, the winder stops temporarily. The storage roll (and the rolled plastic sheeting on it) is taken away, a new core is brought in, and manufacturing resumes.

It will be appreciated that the thickness of the sheet which emerges from the roll stack will be determined almost entirely by the separation between the first two rollers. This separation will typically be only a few thousandths of an inch, and must be maintained with great precision, even though the diameter of the rollers typically exceeds a foot.

Conventionally, the outer surfaces of the two rollers are held apart, at precisely the correct separation, with a pair of machine screw jacks between the shafts. One machine screw jack is placed at each end of the shafts.

The shaft of the first roller is held rigidly in place by a fixed support. The shaft of the second roller is supported by a pivot (or, equivalently, a slide). It is forced against the machine screw jacks by a hydraulic press. The hydraulic press must provide great pressure, since the two rollers are providing great pressure onto the thick extruded molten plastic, and compressing it into very thin sheeting.

The hydraulic press is undesirable for at least three reasons.

First, the hydraulic fluid is under great pressure. It will inevitably leak after a while, and will then squirt out with great force. This threatens the workers, the machinery, and the sheet manufacturing process alike.

Second, a hydraulic press is slow to respond to emergency situations. If a worker gets his hand stuck between the rollers, it can take up to two seconds for the press to discontinue its pressure on the rollers and open at least four inches (as required by Occupational Safety and Health Act regulations). Discontinued pressure is required before the rollers can be separated far enough for the worker to remove his hand.

Third, the hydraulic system requires considerable maintenance. Dirt in the hydraulic n system may cause failure.

BRIEF SUMMARY OF THE INVENTION

Applicants have eliminated the need for a hydraulic press, thereby enabling a rapid response to emergency situations. At the same time, the first and second rollers provide great compression of the plastic, while forcing it to a precise thickness.

The first roller is no longer held rigidly in place. Instead, it is mounted on a slide. The precise position of the slide (and, thus, of the first roller) is determined by a machine screw actuator. Rotating the machine screw actuator moves the slide (and first roller), slowly, to the correct position. The slide (and first roller) are then locked in place, and manufacturing begins.

The first roller plays no part of the quick-release mechanism when an emergency situation arises. That mechanism is provided by the apparatus which controls the second roller.

The shaft of the second roller, as in the prior art, is supported by a pivot (or, equivalently, a slide). Moving the shaft around the pivot allows the second roller to be moved four inches laterally when an emergency situation arises.

Unlike the prior art, the shaft of the second roller is not forced into place by a hydraulic press, but by a jointed toggle. When the joint passes reaches an exterior angle of 180 degrees, the second roller is pressed almost—but not quite—against the first roller. The joint comes to rest against a stop. After passing through the 180 degree angle, the joint continues to an angle of 180 degrees or slightly more than 180 degrees. If the angle is more than 180 degrees, the joint thereby backs the second roller slightly away from the first roller. In either case, the joint comes to rest against a stop, thereby locking the toggle mechanism in place.

When the plastic provides pressure on the second roller, the roller transmits this pressure to the jointed toggle. The jointed toggle is quite strong, and is quite firmly supported at its end opposite the roller by a fixed support. Since the joint is at an angle of at or near 180 degrees, this end of the joint takes all or most of the pressure, which may be considerable. None, or only a slight portion, of the pressure is transmitted to the stop. Additional pressure will not cause the joint to open, since it is already at or slightly past the 180 degree point, and is prevented by the stop from opening any further.

Preferably, the stop is be placed so that the toggle joint reaches an exterior angle of about 190 degrees. This embodiment has the advantage of greater stability, since the joint is not too easily forced back through the 180 degree angle by accident. This would result in the rollers being forced several inches apart from each other by the pressure of the plastic. This in turn would stop the manufacture of the sheet. This alternative embodiment also has the disadvantage of requiring a stronger (and more expensive) stop.

The preferred moderate-pressure lifting device is a moderately-pressurized pneumatic cylinder. This provides several advantages.

First, the operating fluid is air rather than hydraulic fluid. When the cylinder eventually springs a leak, it will be air rather than hydraulic fluid which is sprayed over everything.

Second, the air is under only moderate pressure. This further reduces the damage caused by the high pressure which the conventional-art hydraulic fluid is under.

Third, the moderate air pressure can be overcome, in an emergency situation, by applying a somewhat greater external force against the joint. This is possible for two reasons. First, the air is under only moderate pressure. Second, it can easily be temporarily further compressed. Hydraulic fluid, in contrast, is designed to be practically incompressible.

This external force forces the exterior angle of the joint from 180 degrees down to about 170 degrees. Alternatively, this external force forces the exterior angle of the joint from 190 degrees back through 180 degrees and down to about 170 degrees. At this point, the pressure of the plastic on the second roller rapidly forces the angle of the joint further down, down to almost zero degrees. This in turn rapidly separates the second roller away from the first roller, thereby ending the emergency situation.

Suitable safety equipment, such as an over-pressure sensor, may apply this external force. Moreover, this external force may also be applied by the worker's other hand—and the worker knows this. This knowledge—that he has safety-control over the machinery—is of great psychological benefit to the worker even if there never is an accident.

Lifting devices other than a pneumatic cylinder may be used. These devices include an eccentric, an electromagnet, a wedge-and-wheel combination, a spring, and an air bag.

DETAILED DESCRIPTION OF THE INVENTION

Figure 1:
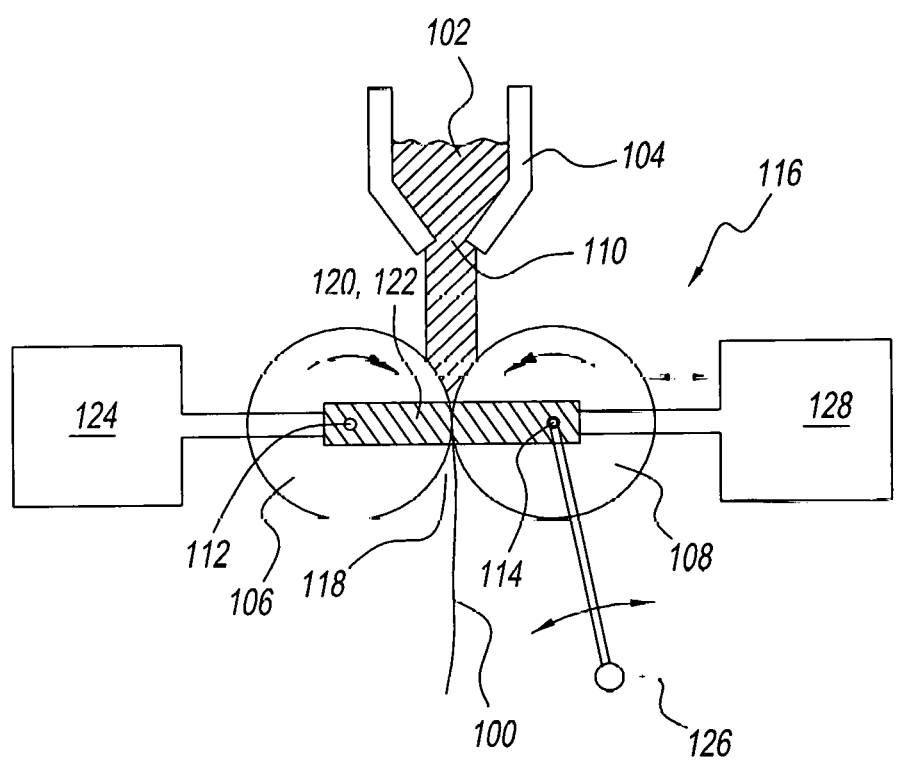
FIG. 1 is a vertical cross-sectional view of the prior art.

The following glossary describes the reference numbers which appear in the drawings:
100 plastic sheeting
102 molten plastic
104 slot die
106 first roller (see also 206)
108 second roller (see also 208)
110 slot
112 first roller's axial shaft
114 second roller's axial shaft
116 roll stack
118 separation
120 first machine screw jack
122 second machine screw jack
124 support for first shaft
126 pivot (or slide; see also 226)
128 hydraulic press
228 slide
230 machine screw actuator
232 jointed toggle
234 leg of toggle
236 joint of toggle
238 exterior angle
240 stop
242 toggle end
244 toggle support
246 lifting device
344 pneumatic cylinder
446 eccentric
460 handle
546 electromagnet
570 power source
602 wedge-and-wheel combination
604 wheel
606 wedge
702 spring
704 support
802 air bag
804 compressor FIG. 1 is a vertical cross-sectional view of the prior art. Plastic sheeting 100 is manufactured by extruding molten plastic 102 through a slot die 104. The slot die 104 is held above a pair of parallel horizontal rollers 106, 108, with the slot 110 oriented parallel to the axial shafts 112, 114 of the rollers 106, 108. The extruded molten plastic 102 is compressed and rolled between the two rollers 106, 108. These rollers 106, 108 are actively cooled, and remove enough heat from the molten plastic 102 that it is no longer molten after it has passed between them.

A horizontal configuration allows gravity to assist the flow of molten plastic 102 between rollers 106, 108. However, a vertical (or any other) configuration may be used if the plastic sheeting 100 is properly supported. The following discussion assumes a horizontal configuration of the rollers 106, 108. The lifting device 246 (see FIG. 2) is therefore aptly named, since it provides a vertical lift. If the rollers 106, 108 have a non-horizontal configuration, the "lifting" device 246 must be re-oriented to provide an appropriately non-vertical "lift".

Usually, although not necessarily, the resulting plastic sheet 100 is then rolled over a third roller (not shown). The third roller can provide additional cooling, tensioning, texturing of the sheet's surface, or other finishing.

The combination of the three (or two) rollers is called a "roll stack" 116. The sheet 100, upon emerging from the roll stack 116, is rolled onto a storage roll on a winder (not shown). When the storage roll is full, the winder stops temporarily. The storage roll (and the rolled plastic sheeting on it) is taken away, a new core is brought in, and manufacturing resumes.

It will be appreciated that the thickness of the sheet 100 which emerges from the roll stack 116 will be determined almost entirely by the separation 118 between the first two rollers 106, 108. This separation 118 will typically be only a few thousandths of an inch, and must be maintained with great precision, even though the diameter of the rollers 106, 108 typically exceeds a foot.

Conventionally, the outer surfaces of the two rollers 106, 108 are held apart, at precisely the correct separation, with a pair of machine screw jacks 120, 122 between the shafts 112, 114. One machine screw jacks 120, 122 is placed at each end of the shafts 112, 114.

The shaft 112 of the first roller 106 is held rigidly in place by a fixed support 124. The shaft 114 of the second roller 108 is supported by a pivot 126 (or, equivalently, a slide). It is forced against the machine screw jacks 120, 122 by a hydraulic hydraulic press 128. The hydraulic hydraulic press 128 must provide great pressure, since the two rollers 106, 108 are providing great pressure onto the thick extruded molten plastic 102, and compressing it into very thin sheeting 100.

The hydraulic hydraulic press 128 is undesirable for at least three reasons.

First, the hydraulic fluid is under great pressure. It will inevitably leak after a while, and will then squirt out with great force. This threatens the workers, the machinery, and the sheet manufacturing process alike.

Second, a hydraulic hydraulic press 128 is slow to respond to emergency situations. If a worker gets his hand stuck between the rollers 106, 108, it can take up to two seconds for the hydraulic press 128 to discontinue its pressure on the rollers 106, 108 and open at least four inches (as required by Occupational Safety and Health Act regulations). Discontinued pressure is required before the rollers 106, 108 can be separated far enough for the worker to remove his hand.

Third, the hydraulic system requires considerable maintenance. Dirt in the hydraulic system may cause failure.

Figure 2:
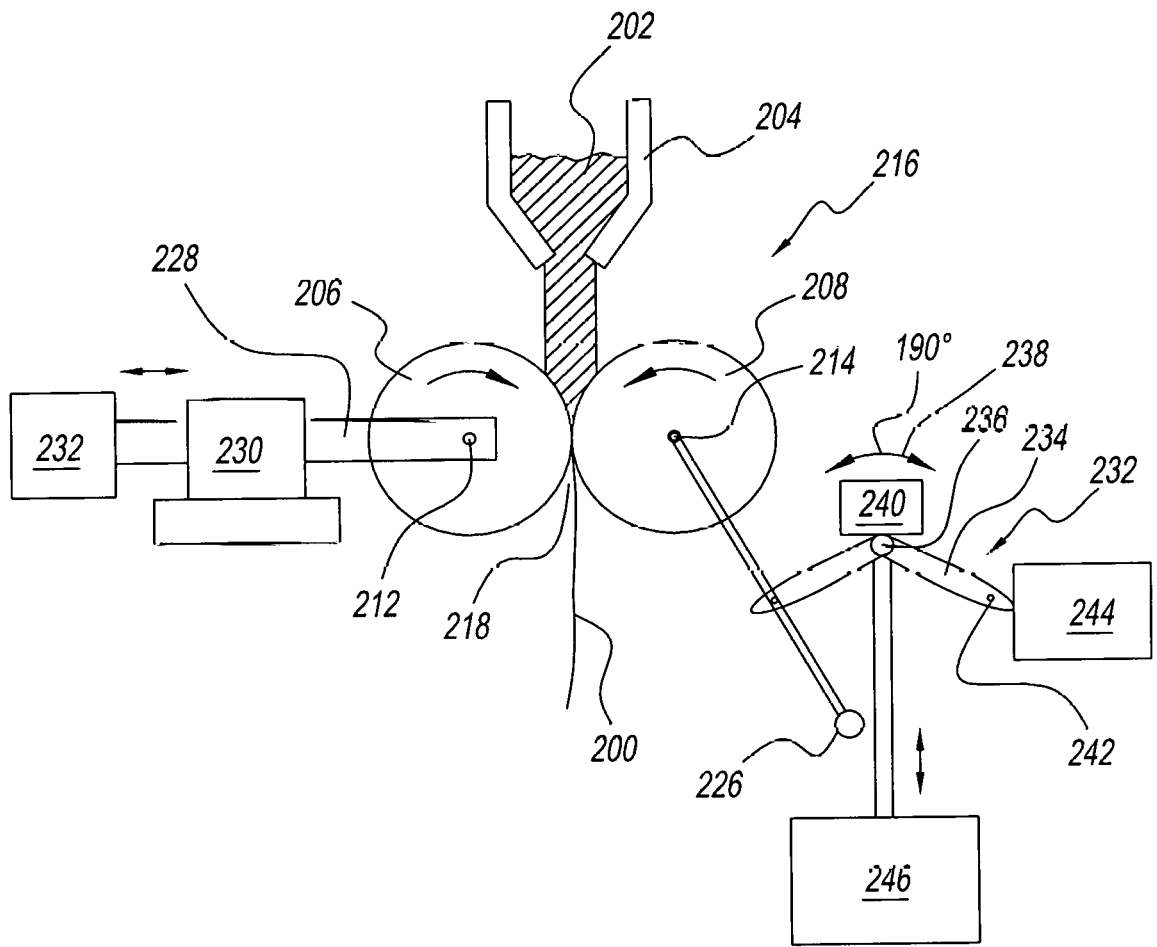
FIG. 2 is a vertical cross-sectional view of a generalized embodiment of the present invention showing a general lifting device.

FIG. 2 is a vertical cross-sectional view of a generalized embodiment of the present invention, showing a general lifting device. It shows how applicants have eliminated the need for a hydraulic press, thereby enabling a rapid response to emergency situations. At the same time, the first and second rollers provide great compression of the plastic, while forcing it to a precise thickness. Reference numbers for the elements shown in FIG. 2 are incremented by 100 from the corresponding elements of FIG. 1.

The first roller 206 is no longer held rigidly in place. Instead, it is mounted on a slide 228, and the precise position of the slide 228 (and, thus, of the first roller 206) is determined by a machine screw actuator 230. Rotating the machine screw actuator 230 moves the slide 228 (and first roller 206), slowly, to the correct position. The slide 228 (and first roller 206) are then locked in place, and manufacturing begins.

The first roller 206 plays no part of the quick-release mechanism when an emergency situation arises. That mechanism is provided by the apparatus which controls the second roller 208.

The shaft 214 of the second roller 208, as in the prior art, is supported by a pivot (or, 226. Moving the shaft 214 around the 226 allows the second roller 208 to be moved four inches laterally when an emergency situation arises.

Unlike the prior art, the shaft 214 of the second roller 208 is not forced into place by a hydraulic press 128, but by a jointed toggle 232. The toggle 232 comprises two legs 234 and a joint 236. When the joint 236 of the toggle 232 passes through an exterior angle 238 of 180 degrees, the second roller 208 is pressed almost—but not quite—against the first roller 206. After passing through the 180 degree angle 238, the joint 236 continues to an angle 238 of about 190 degrees, thereby backing the second roller 208 slightly away from the first roller 206. At this 190 degree angle 238, the joint 236 comes to rest against a stop 240. Angles other than 190 degrees can be used as operational requirements dictate.

When the plastic 202 provides pressure on the second roller 208, the roller transmits this pressure to the jointed toggle 232. The jointed toggle 232 is quite strong, and is quite firmly supported at its end 242 opposite the roller by a fixed support 244. Since the joint 236 is at an angle of at or near 180 degrees, this end of the joint takes all or most of the pressure, which may be considerable. None, or only a slight portion, of the pressure is transmitted to the stop 240. Additional pressure will not cause the joint 236 to open, since it is already at or slightly past the 180 degree point, and is prevented by the stop 240 from opening any further.

Even when the roller is not providing any pressure, the joint is held in place against the stop by a moderate-pressure lifting device 246. The lifting device 246 on the toggle 232 is structured such that a moderate downward external force can separate the rollers 206, 208. This external force forces the angle 238 of the joint 236 from 190 degrees back through 180 degrees and down to about 170 degrees. At this point, the pressure of the plastic 202 on the second roller 208 rapidly forces the angle 238 of the joint 236 further down, down to almost zero degrees. This in turn rapidly separates the second roller 208 away from the first roller 206, thereby ending the emergency situation.

Figure 3:
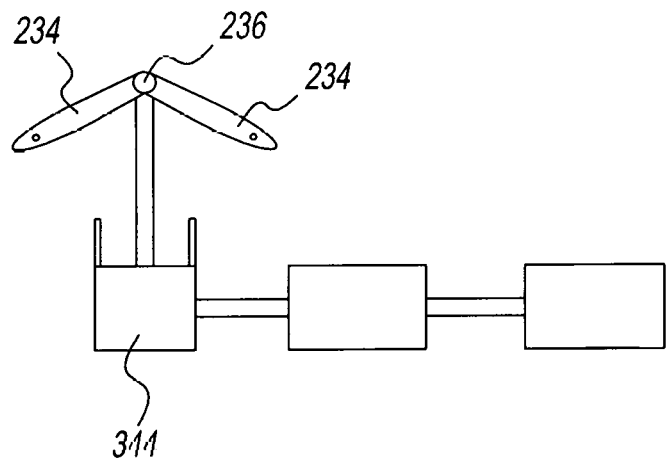
FIG. 3 is a vertical cross-sectional view of a first specific embodiment of the present invention, featuring a moderately-pressurized pneumatic cylinder.

FIG. 3 is a vertical cross section of a first specific embodiment of the present invention, and features a moderately-pressurized pneumatic cylinder 344 as the lifting device 246. A moderately-pressurized pneumatic cylinder provides several advantages.

First, the operating fluid is air rather than hydraulic fluid. When the cylinder 244 eventually springs a leak, it will be air rather than hydraulic fluid which is sprayed over everything.

Second, the air is under only moderate pressure. This further reduces the damage caused by the high pressure which the conventional-art hydraulic fluid is under.

Third, the moderate air pressure can be overcome, in an emergency situation, by applying a somewhat greater external force against the joint 236. This is possible for two reasons. First, the air is under only moderate pressure. Second, it can easily be temporarily further compressed. Hydraulic fluid, in contrast, is designed to be practically incompressible.

Suitable safety equipment, such as an over-pressure sensor, may apply this external force. Moreover, this external force may also be applied by the worker's other hand—and the worker knows this. This knowledge—that he has safety-control over the machinery—is of great psychological benefit to the worker even if there never is an accident.

Figure 4:
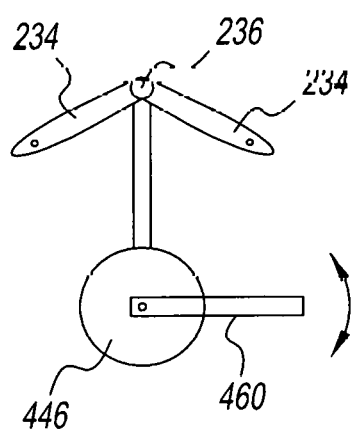
FIG. 4 is a vertical cross-sectional view of a second specific embodiment of the present invention, featuring an eccentric, with an external handle which the operator can turn.

FIG. 4 is a vertical cross-sectional view of a second specific embodiment of the present invention, featuring an eccentric 446, with an external handle 460 which the operator can turn.

Figure 5:
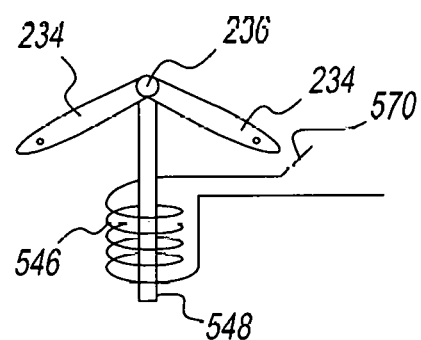
FIG. 5 is a vertical cross-sectional view of a second specific embodiment of the present invention, featuring an electromagnet.

FIG. 5 is a vertical cross-sectional view of a second specific embodiment of the present invention, featuring an electromagnet 546. It is energized by an external power source 570. If power fails, the weight of the axial core 548 pulls down on the joint 236 and separates the rollers.

Figure 6:
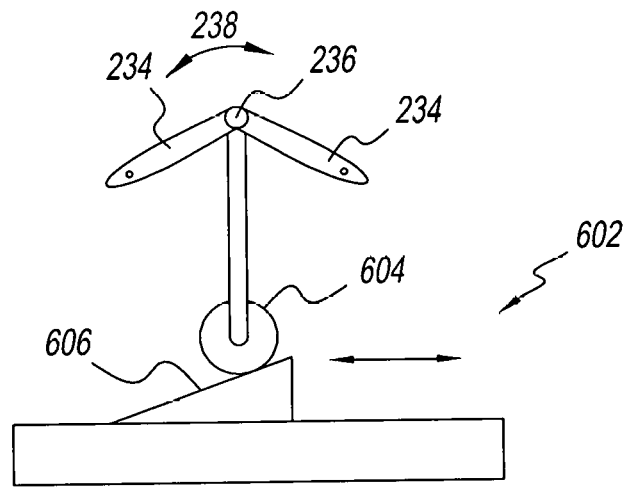
FIG. 6 is a vertical cross-sectional view of a second specific embodiment of the present invention, featuring a wedge-and-wheel combination.

FIG. 6 is a vertical cross-sectional view of a second specific embodiment of the present invention, featuring a wedge-and-wheel combination 602. A wheel 604 rides on a wedge 606. As the wedge 606 moves to the left, the wheel 604 is forced upward, raising the joint 236 and locking it into place. Pressing down on the joint 236 slides the wedge to the right and separates the rollers.

Figure 7:
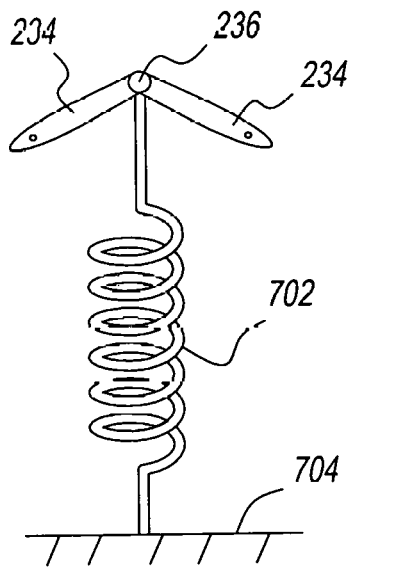
FIG. 7 is a vertical cross-sectional view of a second specific embodiment of the present invention, featuring a spring.

FIG. 7 is a vertical cross-sectional view of a second specific embodiment of the present invention, featuring a spring 702 which is supported by a support 704.

Figure 8:
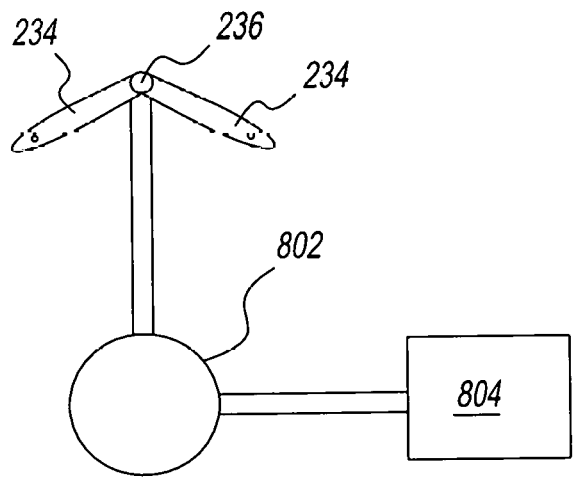
FIG. 8 is a vertical cross-sectional view of a second specific embodiment of the present invention, featuring an air bag.

FIG. 8 is a vertical cross-sectional view of a second specific embodiment of the present invention, featuring an air bag 802. The air bag 802 is inflated by an electrically-powered compressor 804. When the power goes out, the bag deflates under its own weight, and thus allows for an orderly shut-down.

We claim as our invention:

1. A roll stack, comprising, in combination:
    (a) a first roller;
    (b) a second roller;
    (c) a slide supporting the first roller;
    (d) a machine screw actuator situated to slide the slide to separate the first roller and the second roller to form a separation of a desired thickness;
    (e) a pivot supporting the second roller;

(f) a toggle situated to rotate the pivot, the toggle including a joint;
(g) a moderate-pressure lifting device operatively connected to the joint; and
(h) a stop situated to stop the joint when the joint attains an exterior angle of 180 to 190 degrees.

2. The roll stack according to claim 1, wherein the lifting device comprises a pneumatic cylinder.

3. The roll stack according to claim 1, wherein the lifting device comprises an eccentric.

4. The roll stack according to claim 1, wherein the lifting device comprises an electromagnet.

5. The roll stack according to claim 1, wherein the lifting device comprises a wedge-and-wheel combination.

6. The roll stack according to claim 1, wherein the lifting device comprises a spring.

7. The roll stack according to claim 1, wherein the lifting device comprises an air bag inflated by an electrically-powered compressor.

8. A method for making plastic sheeting, comprising, in combination:
   (a) inserting molten plastic into the separation of the roll stack according to any of claims 1 through 7; and
   (b) rolling the first and second rollers to draw the plastic through the separation.

\* \* \* \* \*